UNITED STATES PATENT OFFICE.

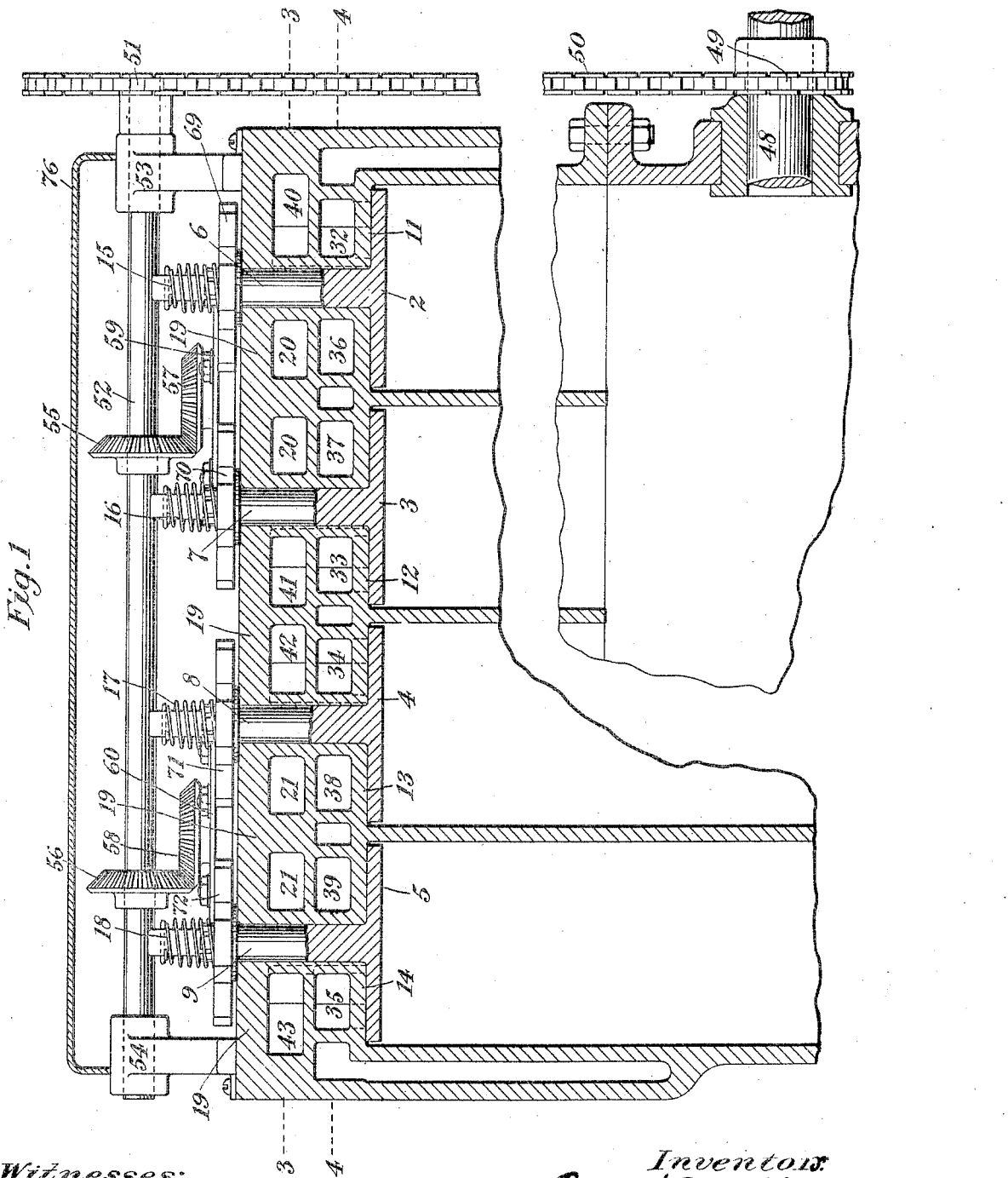

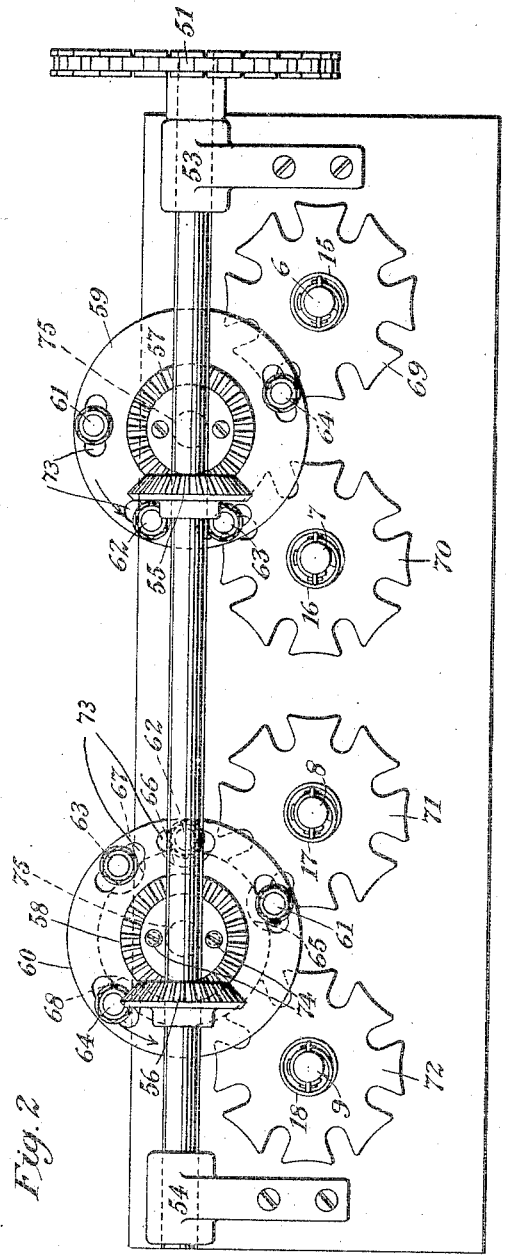
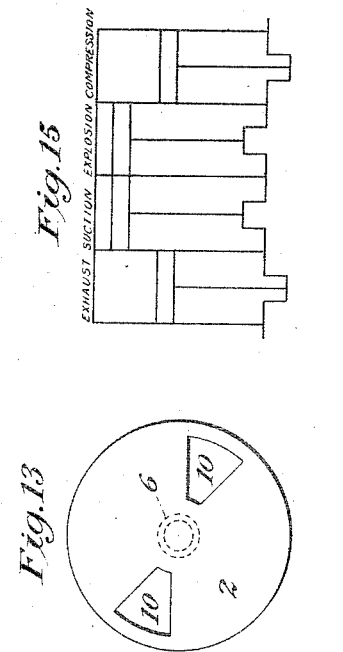
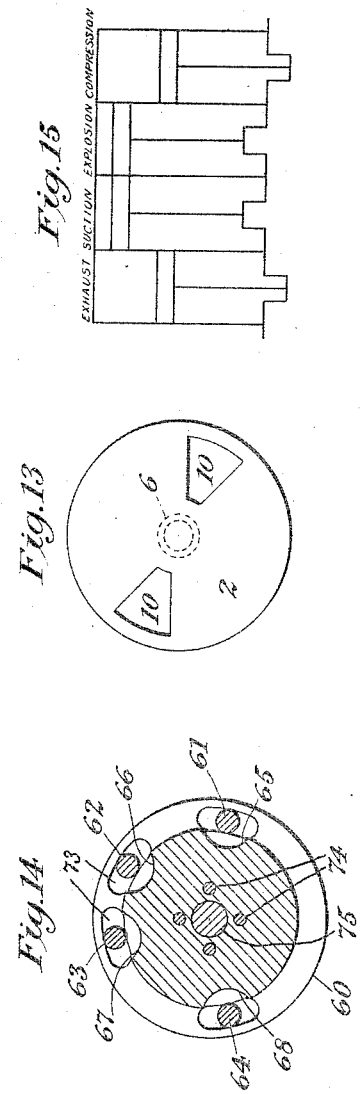

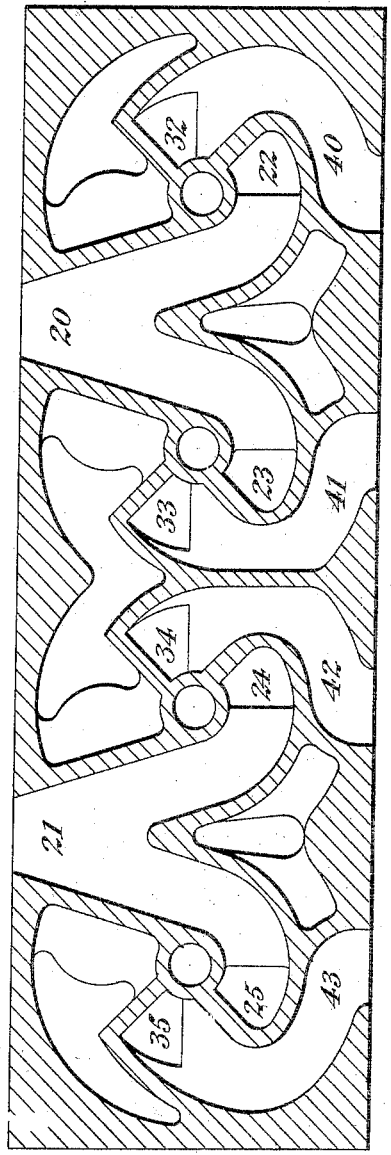
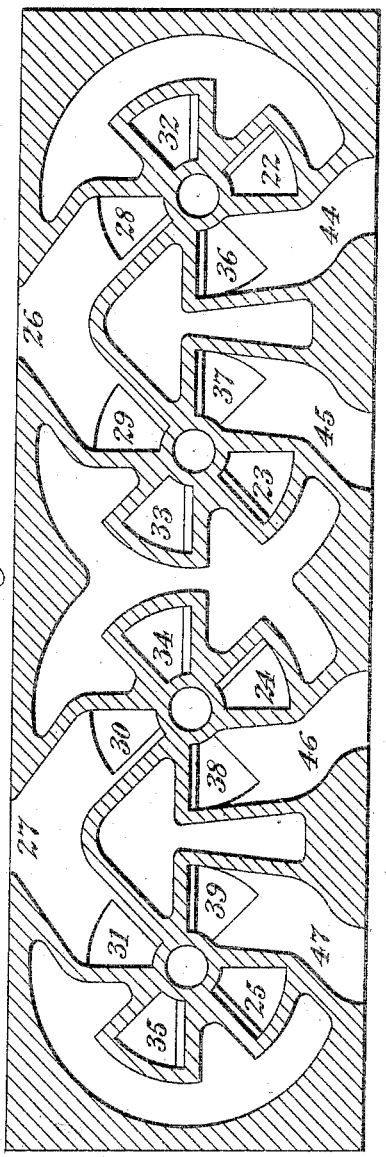

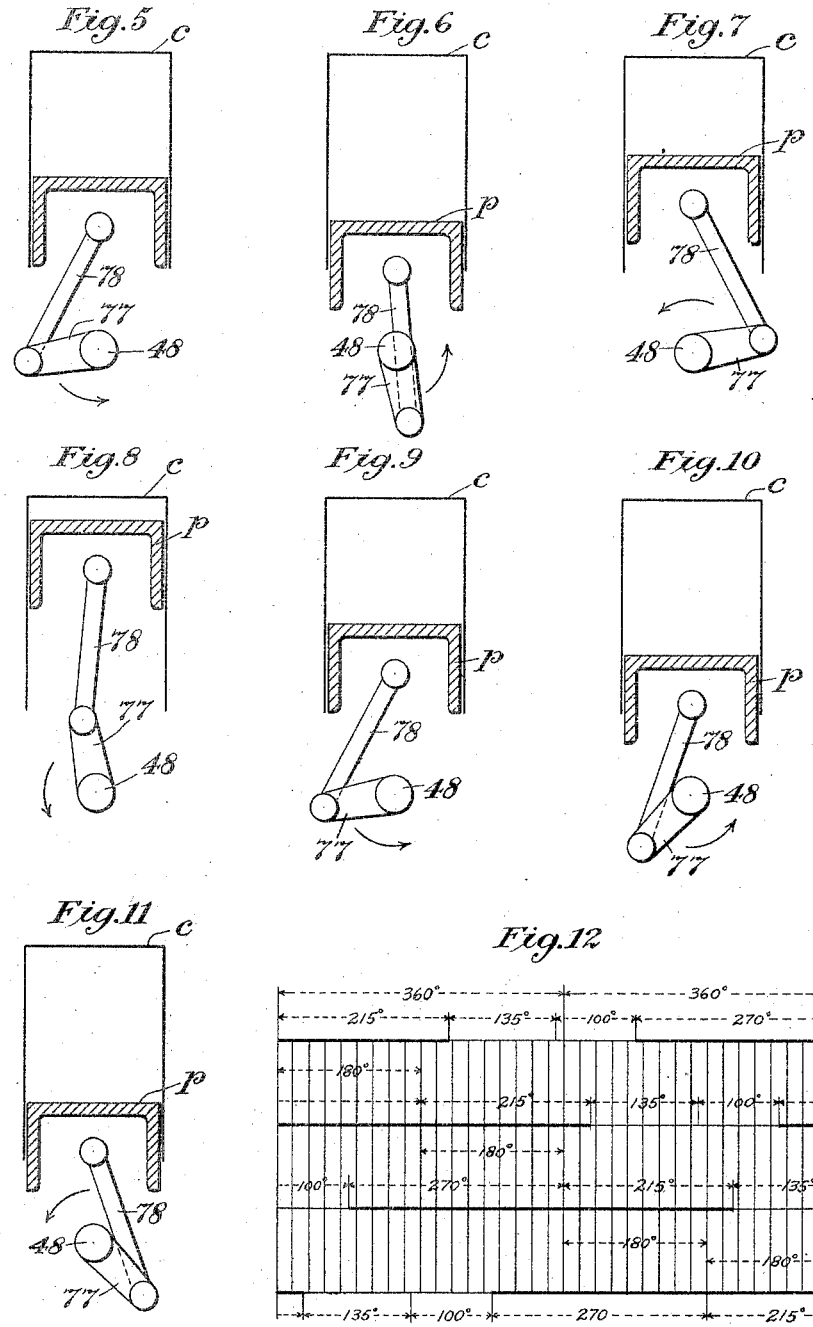

PAUL H. MUELLER AND LUDWIG H. SCHULER, OF BROOKLYN, NEW YORK, ASSIGNORS, BY DIRECT AND MESNE ASSIGNMENTS, TO L-M-S. MOTOR CO., OF ESOPUS, NEW YORK, A CORPORATION OF NEW YORK.

INTERNAL-COMBUSTION ENGINE.

1,098,679.  Specification of Letters Patent.  Patented June 2, 1914.

Application filed July 8, 1912. Serial No. 708,146.

*To all whom it may concern:*

Be it known that we, PAUL H. MUELLER and LUDWIG H. SCHULER, subjects of Germany, and residents of Brooklyn, in the county of Kings and State of New York, have invented certain new and useful Improvements in Internal-Combustion Engines, of which the following is a specification.

This invention relates to improvements in internal combustion engines, and particularly to the valve mechanism thereof and operating connections therefor; it being in one of its aspects an improvement upon that disclosed in our prior application Serial No. 670,141, filed January 9, 1912, in which we have illustrated a simple valve mechanism of a type having a valve, not of the reciprocating or puppet type, but preferably of the rotary type, the operation of which is unaffected by pressure in the cylinder during the periods of compression and explosion. In said application this rotary valve is a combined admission and exhaust valve intermittently actuated in such a manner that it turns during admission and exhaust and is prevented from turning during the compression and explosion periods of the cycle of operations of the cylinder.

While, as before stated, our present invention is in one of its aspects an improvement upon that disclosed in our aforesaid prior application and in particular involves improvements in the means for and mode of operating such a rotary valve or a combined admission and exhaust valve; yet in its main aspect our present invention is primarily an improvement upon the types of valve mechanism heretofore commonly used in internal combustion engines in which reciprocating valves or sliding rings (as in the Knight type of engine) are employed to control the periods of admission and exhaust and to prolong one or both of these periods.

In its main aspect the principal feature of our invention is a valve mechanism in which a rotary valve or a combined admission and exhaust valve, and preferably a rotary valve which is both a combined admission and exhaust valve, is operated in such a manner as to prolong the normal period or periods that the inlet or the outlet port, or both, is or are open, the object being to increase the charge delivered to a cylinder in a given time, or reduce the time required to clear out the cylinder after an explosion, or to do both of these things as desired.

In other words, in its main aspect the principal object of our invention is to obtain with a rotary valve or with a combined admission and exhaust valve, and preferably with a rotary valve which is both a combined admission and exhaust valve, the same range or flexibility of operation that has heretofore only been obtained by the use of reciprocating or single-acting valves or rings. With such flexibility of operation great power is of course readily and quickly obtainable in emergencies or for hill climbing, carrying heavy loads, etc.

Not only do we provide for the rapid delivery of a large charge to a cylinder by prolonging the normal period that the inlet port is open, and the rapid discharge of the burned gases, etc., from the cylinder by prolonging the period that the exhaust port is open, but we also preferably provide means for varying this period of prolongation of admission or exhaust or both as may be desired. By providing this additional flexibility of operation it will be seen that the valve mechanism may be set for any period of prolongation of admission or exhaust (within limits) that may be found desirable.

Another important feature of our present invention is the application of such a valve mechanism as has just been described to a multi-cylinder internal combustion engine, and the provision of means for operating a plurality of valves, such as hereinbefore specified, in similar cycles differing in phase, as in the manner usual in internal combustion engines, but in which admission or exhaust, or both, will be prolonged in each cycle beyond the period normal to such an engine, that is, with the normal cycle understood to be one in which the whole cycle is divided into four equal parts or periods in which the successive periods are respectively those of admission, compression, explosion and exhaust, it will be understood that in accordance with our present invention, by using a valve or valves such as indicated, these normal periods for admission or exhaust, or both, will be prolonged and the corresponding periods for compression and explosion, or both compression and explosion periods, will be shortened.

Other features of the invention not hereinbefore referred to will be hereinafter described and claimed and are illustrated in the accompanying drawings, in which—

Figure 1 is a substantially central, vertical section of so much of a multi-cylinder internal combustion engine of the four-cylinder type as is necessary for the purpose of illustrating the application of our present invention thereto; Fig. 2 is a plan of the same with the casing of the valve mechanism removed; Fig. 3 is a horizontal section of the same, the section being taken in line 3—3, Fig. 1 illustrating the inlet and outlet ports as they appear at one level; Fig. 4 is a similar view, the section being taken in line 4—4, Fig. 1 illustrating said ports at a different level; Figs. 5 to 11 inclusive are diagrammatic views illustrating the relations of piston, cylinder and crank-shaft of a single cylinder at different points in the cycle of operations which will be hereinafter described; Fig. 12 is a diagram or chart illustrating the interrelation and timing of the four cycles of operation of all the cylinders of a four-cylinder engine; Fig. 13 is a face or under-side view of one of the valves; Fig. 14 is a detail illustrating in horizontal section a portion of the operating connections of a valve; and Fig. 15 is a diagram showing the relations of the starting points of the four periods of each cycle to one another and to the corresponding positions of the crank in the ordinary four-cylinder engine.

Similar characters designate like parts in all the figures of the drawings.

As in the case of the invention disclosed in our aforesaid prior application our present invention may be applied to various kinds of internal combustion engines, stationary or movable, and it is to be understood that so far as the main features of our present invention are concerned the particular engine shown in the drawings is merely illustrative of one mechanism in which the invention may be embodied. In order, however, to illustrate the application of certain specific features of the invention to internal combustion engines we have shown a four-cylinder engine of the ordinary four-cycle type with the four cylinders of which are combined suitable means for controlling the admission and exhaust for each cylinder through a single valve in accordance with one feature of our invention. The admission and exhaust ports leading to and from each cylinder may also be located at any suitable points and may coöperate with the valve mechanism in any proper manner so long as the inlet and outlet ports for each cylinder are all controlled by the same valve when a single valve common to admission and exhaust is employed. In the present case the valve mechanism embodies a plurality of inlet ports and a plurality of outlet ports for each cylinder, these sets of ports being intended to coöperate with correspondingly positioned sets of ports in the respective valves associated therewith. By providing a plurality of inlet ports and a plurality of outlet ports for each cylinder either cylinder is enabled to take a heavy charge when it is desirable, as in going up steep grades, hauling heavy loads, etc., and the rapid discharge of the waste gases and other products of combustion from each cylinder and consequent thorough scavenging thereof is assured. The detailed description of the construction and function of these ports will follow the description of the valves and their operating mechanism. For the purpose of controlling the opening and closing in proper succession of these inlet and outlet ports of the engine we prefer, as in our prior application, to make use of a valve which is both a rotary valve and a combined admission and exhaust valve, and which has one or more ports each adapted to register at the proper times first with one and then with the other of the ports or set of engine ports for admission and exhaust. As in our prior application aforesaid, each valve may be located at any suitable point in the engine where it will perform its functions properly. In the construction illustrated it is shown as located in the explosion chamber itself, but it is of course clear that it may be placed out of the zone of the explosion chamber and at any proper point in the passages leading to the explosion chamber. The controlling movement of the valve may be any suitable for the purpose of uncovering and covering, in the manner hereinbefore described, in the proper order the inlet and outlet ports of its cylinder, but as one of the main features of our invention involves the use of a rotary valve, and as we prefer, even in connection with a combined admission and exhaust valve, which involves another important feature of our invention, to employ a rotary type of valve, this movement will in all cases preferably be a rotary one, and will also preferably be derived from the power developed in the engine, usually directly from the main crank-shaft. Though this rotary movement may be of any character suitable for prolonging the period that one or both of the main ports (inlet and outlet) of a cylinder is or are open it will preferably be an intermittent movement having two dwells or stops corresponding to the periods of compression and explosion; and when such a valve is employed and is exposed to the pressure of a charge either during compression or explosion it will turn only during the periods of admission and exhaust.

The specific valve illustrated is a rotary disk valve, four of which valves are shown at 2, 3, 4 and 5 respectively. Each has a stem adapted to be operatively connected with means for actuating or turning the valve, these stems being indicated at 6, 7, 8 and 9 respectively. Each of these disk valves preferably has a plurality of ports through each of which admission or exhaust takes place according to the position of the valve, these ports being indicated in Fig. 13 by 10—10. Said ports are so positioned and shaped as to coöperate with the fixed inlet and outlet ports of the cylinder previously referred to. Each of said valves is intended to be seated constantly against a suitable fixed wall of the engine, as, for example, against the valve-seats 11, 12, 13 and 14; and substantially the whole back wall of each valve rests in this case against its seat. It will be seen that whatever the rotary position of any valve may be said valve is in constant engagement with its seat, the seating of the valve being assisted in the present case as in our former application by means of a spring working between suitable stops. These springs are indicated at 15, 16, 17 and 18. Here the stems 6, 7, 8 and 9 of the valves are journaled in bearings in the upper ends or heads, 19, of the cylinders and project outside the walls of the engine into position for connection with suitable means for actuating them.

It will be understood that while the preferred type of valve has a plurality of ports this is for the purpose of facilitating admission of a charge and expulsion of the burned gases, etc., and that so far as the proper intermittent operation of a valve of any cylinder is concerned a single port can as well be used as a plurality of ports. Owing, however, to the additional advantages to be derived from the use of a plurality of ports in each valve and the use of a corresponding plurality or set of ports of each kind—inlet and outlet—in the cylinder head, we have illustrated valves having a plurality of ports. The inlet and outlet ports leading to and from each cylinder are shown (see particularly Figs. 1, 3 and 4) as corresponding in numbers and positions with the ports in their respective valves; that is to say, with a valve having two diametrically opposite inlet ports such as 10—10—which are also at the proper times outlet ports—will be associated corresponding sets or pairs of inlet and outlet ports in the associated cylinder of the engine. The manner in which these ports are constructed will be clear by referring to these views. It will be seen that there are sets of inlet and outlet passages located in different horizontal planes, but suitably connected so that all of the inlet ports and passages for each cylinder communicate with the main inlet to that cylinder while all of the outlet ports and passages of that cylinder communicate with the main outlet from the same cylinder.

Referring particularly to Figs. 3 and 4 it will be seen that there are in this construction four inlets, two upper and two lower, the upper two of which open into passages, 20 and 21, which are substantially horizontal and which communicate with substantially vertical passages, 22, 23, 24 and 25, corresponding to the shape and area of one of the openings 10 in a valve. The lower inlet ports, however, lead into shorter inlet passages, such as 26 and 27, each of which divides and intersects a pair of substantially vertical passages similar to those shown at 22 to 25 inclusive. These vertical passages which are indicated at 28, 29, 30 and 31, are here disposed respectively in positions diametrically opposite those indicated at 22 to 25 inclusive, in order that both of the ports 10—10 of any valve may register simultaneously with the ports corresponding to its cylinder. In other words, the ports 10—10 of valve 2 will register simultaneously with the vertical ports 22 and 28; the ports of valve 3 will register simultaneously with ports 23 and 29; the ports of valve 4 will register simultaneously with ports 24 and 30, and the ports of valve 5 will register simultaneously with ports 25 and 31. The vertical passages 22 to 25 inclusive are substantially twice the length of the passages 28 to 31 inclusive because the inlets of the passages 20 and 21 on the one hand and 26 and 27 on the other hand are located at different levels. The ports and passages through which the burned gases, etc., are permitted to escape are also disposed at different levels. Two diametrically opposite vertical outlet passages are shown for each cylinder. The ports of one of these sets are indicated at 32, 33, 34 and 35. Those of the other set are shown at 36, 37, 38 and 39. Each of the passages 32 to 35 inclusive is substantially twice the length of each of the corresponding passages 36 to 39 respectively (for reasons similar to those just given) and each leads into a substantially horizontal upper outlet passage, the passages for the four cylinders being designated respectively by 40, 41, 42 and 43. The shorter vertical passages 36 to 39 inclusive are shown as intersecting substantially horizontal outlet passages, 44, 45, 46 and 47, disposed at a lower level. The inlets and outlets just described will, of course, communicate directly with a corresponding main inlet and a main exhaust pipe in a suitable manner. It will be seen from Fig. 4 that not only are the vertical inlet and outlet passages so disposed that corresponding passages and ports are opposite each other, but that at each cylinder all of the passages and ports thereof are located about a common center, which is the axis of the corresponding valve, and are spaced substantially 90° apart in order that admission and exhaust may take place properly.

The means for actuating each of the combined admission and exhaust valves shown for the purpose of carrying its port or ports through its proper cycle of movement may be any suitable for the purpose of prolonging the period of admission or exhaust, or both, in the manner before mentioned. The means illustrated comprises power-transmitting chain-gearing connecting the main crank-shaft, 48, of the engine with the stems of the valves. The particular connections used may be varied considerably, but those illustrated constitute a simple means for imparting the necessary intermittent movement to rotary valves, and also have the additional advantage of permitting the use of a common actuator or drive-shaft for imparting the necessary variable movements differing in phase to all of the valves of the engine. This transmitting mechanism, as herein illustrated, comprises a small sprocket wheel 49, secured to the crank-shaft 48, a sprocket-chain, 50, and a larger sprocket-wheel, 51, around which said chain passes at its upper end and which is secured to an upper horizontal drive-shaft, 52, journaled in suitable bearings, such as 53 and 54, a pair of bevel-gears, such as 55 and 56, secured to said drive-shaft 52 and corresponding bevel-gears, 57 and 58, meshing with the bevel-gears 55 and 56 and mounted to turn on vertical carriers or studs on top of the head of the engine (as in our aforesaid application) and suitable connections between the bevel-gears 57 and 58 and the stems 6 and 7, and 8 and 9, respectively, of the four valves for operating said valves in the proper timing. The connections between said bevel-gears and the valve-stems may be any suitable for the purpose. Preferably, however, each will be of the type shown, that is to say, it will involve a Geneva movement between said bevel-gear and the stem of each valve, the construction illustrated being one in which a modified form of actuator and stop-wheel of a Geneva movement is common to two separate Geneva-wheels each of which controls the operation of a valve. The actuator and stop-wheel as here shown are in each case suitably modified not only to adapt them for coöperation with two different Geneva-wheels but also are modified in such a manner as to bring about the desired variable action or prolongation of the periods of admission and exhaust for each valve, for the purposes hereinbefore stated. Two of these combined actuators and stop-wheels are shown herein, one being designated generally by 59 and the other by 60. Each has, in this case, four separate actuating pins and four recesses. These actuating pins are in each instance designated respectively by 61, 62, 63 and 64 and the recesses are similarly designated by 65, 66, 67 and 68. (See Fig. 14). The Geneva-wheels which the pins of the combined actuator and stop-wheel 59 are intended to drive are shown at 69 and 70 and those which are intended to be driven by the pins of the combined actuator and stop-wheel 60 are shown at 71 and 72. Each of the Geneva-wheels 69 and 70, and 71 and 72 is secured to the valve-stem which it is intended to drive in such a manner that the stem and the Geneva-wheel will always rotate in unison while the stem may have a movement in the direction of its axis independent of such Geneva-wheel. Each of the Geneva-wheels is held down against its seat at the upper end of the cylinder by one of the springs 15 to 18 inclusive before described, as will be clear by referring to Fig. 1.

As in our aforesaid prior application the recesses 65 to 68 inclusive of each stop-wheel and the intervening stop faces are so proportioned and associated in such a manner with the two Geneva-wheels coacting with the stop-wheel and coöperate with the actuating pins 61 to 64 inclusive in such a manner that each Geneva-wheel—and hence each valve—is operated intermittently, that is to say, during admission and exhaust, and locked against movement intermittently, that is to say, during compression and explosion. The angular relation of these actuating pins and the spaces and stop faces of the stop-wheel, to the different Geneva-wheels, is, however, radically different in the present case from that disclosed and illustrated in our aforesaid prior application. Here the positions of these pins, spaces and stop faces are such as to assure the operation of each valve in a variable manner, that is to say, the valve in each instance will be so operated in the preferred construction and organization of the parts that the period of admission of a charge through the valve will be prolonged and the period of discharge of the burned gases, etc., through the valve will also be prolonged. In the particular construction illustrated, which is one in which the connections between the crank-shaft and the valves have a one to two ratio, a construction in which the actuator wheels revolve once for two revolutions of the crank shaft, the normal period that the inlet port to each cylinder would ordinarily be open is increased to such an extent that it is held wide open for approximately 35° of the crank-shaft's 720° of movement, the valve moving 45° from the closed to the full open position and then being held stationary approximately 35° and then being moved 45° from the full open to the closed position through an arc of 90° of the 720° movement of the crank shaft. Thus with a combined admission and exhaust valve having two large ports disposed opposite each other as shown, not only is there a very quick delivery of a charge to the cylinder because of the large port area through which the charge passes, but this full port area is available throughout an arc of approximately 35° in this case while the valve remains stationary. In a similar manner the valve when operated to exhaust its cylinder here moves through an arc of 45° from its closed to its open position and then remains stationary in the wide open position for approximately 90° of the crank shaft movement and thereafter moves through the usual arc of 45° from the wide open position to the closed position, all during a movement of 720° of the crank-shaft. Obviously in this specific cycle of operations there will be 135° of movement of the continuously rotating crank-shaft during the compression period of the crank-shaft's 720° movement, and similarly there will be 100° of movement of the crank-shaft during the explosion period in each 720° movement of the crank shaft. In neither case, however, that is, neither while it is moving in the aforesaid arc of 135° (corresponding to the compression period) nor while it is moving in the aforesaid arc of 100° (corresponding to the explosion period) will there be any movement of the Geneva-wheel controlling the valve corresponding to the cylinder in which such compression or explosion is taking place. In each such instance said valve will be stationary during both compression and explosion.

The 45° movements of the valves hereinbefore referred to correspond to 90° movements of the crank shaft, since the ratio between the crank shaft and the actuators is one to two, and a 45° movement of one of the pins of the actuator produces a 45° movement of the valve, providing, of course, such pin is in proper relation to the Geneva wheel of the valve. Referring particularly to Fig. 2 of the drawings, the pin 62, for instance, when in proper relation to the Geneva wheel 70, will move the latter through 45° during a movement of 90° of the crank shaft, and this movement opens the admission port. The space between the pins 62 and 61 is of such length that the valve will be permitted to remain still during 35° of movement of the crank shaft. The pin 61 then turns the valve through an additional 45° to fully close the admission port, such movement of the valve corresponding to 90° movement of the crank shaft. The space between the pins 61 and 64 is of such circumferential length that the valve will not be actuated until the crank shaft has moved through 135° and 100° corresponding to the compression and explosion periods. The pin 64 then actuates the Geneva wheel 70 so as to move the latter through 45° and thereby fully open the exhaust ports. The space between the pins 64 and 63 permits the valve to remain stationary during a 90° movement of the crank shaft. The next actuation of the valve is caused by the pin 63 which moves the valve through 45°, and thereby fully closes the exhaust. The pin 62, however, immediately engages the Geneva wheel 70 and moves the valve through an additional 45° to fully open the admission port, as hereinbefore explained.

The specific variable cycle of operations just described may, of course, be changed or varied within wide limits and it is given merely as an example of the flexibility that may be obtained by properly prolonging admission or exhaust or both. A different cycle from that just described may be obtained either by substituting a different combined actuator and stop-wheel for each of those shown at 59 and 60, or by shifting the positions of the actuating pins 61 to 64 inclusive, or any of them, each being shown as adjustable circumferentially of its stop-wheel in suitable slots, such as 73, each actuating pin being held in the desired adjusted position by any suitable clamping means, such as that shown.

The cycle of operations of each valve will also, of course, be the same as that of every other valve, the only difference ordinarily being that they will differ from one another in phase in the usual manner. When it is desired to change the cycle of one of course the cycles of all will be changed so that all will operate in similar cycles differing, as just stated, only in phase. This change may be effected, as before shown, by means of the adjusting slots 73 or on the change-gear principle, by substituting different stop-wheels. To facilitate this each bevel-gear 57 and 58 is shown as secured to its respective stop-wheel by a circuit of screws or equivalent attaching devices, 74, by means of which each stop-wheel may be quickly attached thereto for rotation about its fixed stud 75. It will be obvious from the foregoing description that when the relative positions of the pins are changed by adjusting said pins in the slots, the valve will be opened or closed sooner or later, as the case may be, depending upon the circumferential position of the pins. The adjustment of the pins changes the circumferential distance between the same, and therefore alters the periods of lapse for the valve, since the valve is actuated sooner or later depending upon the circumferential position of the pin. All of the valve mechanism is preferably inclosed in a suitable casing when in operation, as by means of a cover, 76.

In the specific engine illustrated the cycle of operations for a single cylinder will be clear from Figs. 5 to 11 inclusive taken in connection with Figs. 3 and 4. In said first mentioned views 77 indicates a crank of the first cylinder and 78 its piston rod connected to the corresponding piston $p$ working in the cylinder $c$. In the position shown in Fig. 5 the exhaust opens 80° before the crank reaches the bottom center. Fig. 6 shows the positions of these parts at the end of the movement of the valve for uncovering the exhaust ports, it being then 10° beyond the bottom center position. Fig. 7 shows the positions of the parts at the moment the exhaust ports begin to close, the difference between Figs. 6 and 7 illustrating an arc of movement of 90° of the crank-shaft during which the valve remains stationary. Fig. 8 shows the positions of the parts at the moment the exhaust ports close, this position being 10° past the top center. At the same time substantially the inlet ports begin to open. The full open position of the valve is reached by the travel of the crank-shaft through an arc of 90° to the position shown in Fig. 9. The inlet then remains wide open and the valve stationary while the crank is moving through an arc of another 35° to the position shown in Fig. 10 when the valve begins to move again and it continues its movement until the crank reaches the position shown in Fig. 11, 45° beyond the bottom center, at which time the inlet ports are entirely closed. From this point to that illustrated in Fig. 5 the valve remains stationary, that is, it remains stationary during the periods corresponding to compression and explosion of the charge.

Considering the valve movements with respect to the ports and passages before described the valve 2 will first open and then close the two inlet ports 22 and 28 during the period of admission, the valve standing still in its wide open position during the central portion of this admission period. The valve 2 stands still during the next period, that is, during the compression of the charge. During the third period, that is, the period of ignition or firing of the charge the valve 2 still remains stationary as it did during the second period. During the fourth period, however, which is the period of exhaust, the valve 2 first opens and then closes, the exhaust ports or passages 32 and 36 to permit the escape of the burned gases, etc., from the first cylinder. This completes the first cycle of operations for the first cylinder.

The points at which the cycles of operations of the second, third and fourth cylinders begin with respect to the cycle of the first cylinder, are indicated in the diagram Fig. 12. From this diagram, which is divided into periods which clearly illustrate the point at which each movement of each valve begins and stops, it will be clear just what the relations of the various intermittent movements of the valves to one another are and just how the prolongations of the periods of admission and exhaust in each cylinder are related to one another and the extent of arc covered by such prolongation in the specific engine shown.

From the foregoing description of the construction and operation of our improved valve mechanism it will be seen that there is no pressure whatever upon any of the valves due to pressure exerted by an unignited or ignited charge of any cylinder of the engine, notwithstanding the fact that each valve is operated intermittently in a cycle in which admission, compression, explosion and exhaust occupy uneven periods, and that the only resistance to be overcome in operating any of the valves at any time is the normal frictional resistance, etc.

In connection with the parts herein described we may, of course, use any usual or suitable means for controlling power developed at each ignition or explosion of a charge, as, for example, by varying the mixture introduced into any cylinder in any well-known manner and also varying the volume of the charge so introduced, as by throttling. These modes of controlling the operation of an engine in accordance with the requirements under varying loads, etc., are well understood and for this reason have not been specially illustrated or described. They constitute in conjunction with the principal invention disclosed herein a means for obtaining the utmost flexibility of operation and the maximum power that the engine is capable of developing. It will of course be clear that the engine may have any desired number of cylinders all operating in similar cycles so long as they differ properly in phase from one another, and that the invention applies equally to a single cylinder engine, the four cylinder engine shown being merely illustrated as one type that in actual use has given good results.

What we claim is:

1. In an internal combustion engine, the combination with an inlet port for delivering a charge and with an outlet port for the waste gases and products of combustion, of rotary-valve mechanism for opening and closing said ports said mechanism embodying means for reducing the speed of movement of the valve during the period of admission and correspondingly prolonging the normal period that the inlet port is open.

2. In an internal combustion engine, the combination with an inlet port for delivering a charge and with an outlet port for the waste gases and products of combustion, of rotary-valve mechanism for opening and closing said ports said mechanism embodying means for reducing the speed of movement of the valve during the period of exhaust and correspondingly prolonging the normal period that the outlet port is open.

3. In an internal combustion engine, the combination with an inlet port for delivering a charge and with an outlet port for the waste gases and products of combustion, of rotary-valve mechanism for opening and closing said ports said mechanism embodying means for reducing the speed of movement of the valve during the period of admission and also during the period of exhaust and correspondingly prolonging the normal period that the inlet port is open and the normal period that the outlet port is open.

4. In an internal combustion engine, the combination with an inlet port for delivering a charge and with an outlet port for the waste gases and products of combustion, of a combined admission and exhaust valve common to said inlet and outlet ports and having a port adapted to register with said inlet and outlet ports at different times, and means for operating said valve in such a manner as to reduce its speed during the period of admission and correspondingly prolong the normal period that the inlet port is open.

5. In an internal combustion engine, the combination with an inlet port for delivering a charge and with an outlet port for the waste gases and products of combustion, of a combined admission and exhaust valve common to said inlet and outlet ports and having a port adapted to register with said inlet and outlet ports at different times, and means for operating said valve in such a manner as to reduce its speed during the period of exhaust and correspondingly prolong the normal period that the outlet port is open.

6. In an internal combustion engine, the combination with an inlet port for delivering a charge and with an outlet port for the waste gases and products of combustion, of a combined admission and exhaust valve common to said inlet and outlet ports and having a port adapted to register with said inlet and outlet ports at different times, and means for operating said valve in such a manner as to reduce its speed during the period of admission and also during the period of exhaust and correspondingly prolong both the normal period that the inlet port is open and the normal period that the outlet port is open.

7. In an internal combustion engine, the combination with an inlet port for delivering a charge and with an outlet port for the waste gases and products of combustion, of rotary-valve mechanism for opening and closing said ports said mechanism embodying means for intermittently operating a valve during the period of admission in such a manner as to prolong the normal period that the inlet port is open.

8. In an internal combustion engine, the combination with an inlet port for delivering a charge and with an outlet port for the waste gases and products of combustion, of rotary-valve mechanism for opening and closing said ports said mechanism embodying means for intermittently operating a valve during the period of exhaust in such a manner as to prolong the normal period that the outlet port is open.

9. In an internal combustion engine, the combination with an inlet port for delivering a charge and with an outlet port for the waste gases and products of combustion, of rotary-valve mechanism for opening and closing said ports said mechanism embodying means for intermittently operating a valve during the period of admission and also during the period of exhaust in such a manner as to prolong both the normal period that the inlet port is open and the normal period that the outlet port is open.

10. In an internal combustion engine, the combination with an inlet port for delivering a charge and with an outlet port for the waste gases and products of combustion, of a combined admission and exhaust valve common to said inlet and outlet ports and having a port adapted to register with said inlet and outlet ports at different times, and means for intermittently operating said valve during the period of admission in such a manner as to prolong the normal period that the inlet port is open.

11. In an internal combustion engine, the combination with an inlet port for delivering a charge and with an outlet port for the waste gases and products of combustion, of a combined admission and exhaust valve common to said inlet and outlet ports and having a port adapted to register with said inlet and outlet ports at different times, and means for intermittently operating said valve during the period of exhaust in such a manner as to prolong the normal period that the outlet port is open.

12. In an internal combustion engine, the combination with an inlet port for delivering a charge and with an outlet port for the waste gases and products of combustion, of a combined admission and exhaust valve common to said inlet and outlet ports and having a port adapted to register with said inlet and outlet ports at different times, and means for intermittently operating said valve during the period of admission and also during the period of exhaust in such a manner as to prolong both the normal period that the inlet port is open and the normal period that the outlet port is open.

13. In an internal combustion engine, the combination with an inlet port for delivering a charge and with an outlet port for the waste gases and products of combustion, of a combined admission and exhaust valve common to said inlet and outlet ports and having a port adapted to register with said inlet and outlet ports at different times, and means for intermittently operating said valve in such a manner that it has two dwells for each cycle of operations of its cylinder, one during the period of admission for prolonging the normal period that the inlet port is open and the other during the period of exhaust for prolonging the normal period that the outlet port is open.

14. In an internal combustion engine, the combination with an inlet port for delivering a charge and with an outlet port for the waste gases and products of combustion, of a combined admission and exhaust valve common to said inlet and outlet ports and having a port adapted to register with said inlet and outlet ports at different times, and means for intermittently operating said valve in such a manner that it stops twice during each cycle of operations of its cylinder, once during the period of admission for prolonging the normal period that the inlet port is open and once during the period of exhaust for prolonging the normal period that the outlet port is open.

15. In an internal combustion engine, the combination with an inlet port for delivering a charge and with an outlet port for the waste gases and products of combustion, of a rotary combined admission and exhaust valve common to said inlet and outlet ports and having a port adapted to register with said inlet and outlet ports at different times, and means for rotating said valve during the period of admission with a varying movement in such a manner as to prolong the normal period that one of said engine ports is open.

16. In an internal combustion engine, the combination with an inlet port for delivering a charge and with an outlet port for the waste gases and products of combustion, of a rotary combined admission and exhaust valve common to said inlet and outlet ports and having a port adapted to register with said inlet and outlet ports at different times, and means for rotating said valve during the periods of admission and exhaust with varying movements in such a manner as to prolong the normal periods that the inlet and outlet ports are open.

17. In an internal combustion engine, the combination with an inlet port for delivering a charge and with an outlet port for the waste gases and products of combustion, of a rotary combined admission and exhaust valve common to said inlet and outlet ports and having a port adapted to register with said inlet and outlet ports at different times, and means for intermittently rotating said valve while, and in such a manner as to prolong the normal period that, one of said ports is open.

18. In an internal combustion engine, the combination with an inlet port for delivering a charge and with an outlet port for the waste gases and products of combustion, of a rotary combined admission and exhaust valve common to said inlet and outlet ports and having a port adapted to register with said inlet and outlet ports at different times, and means for intermittently rotating said valve while, and in such a manner as to prolong the normal periods that, the inlet and outlet ports are open.

19. In an internal combustion engine, the combination with an inlet port for delivering a charge and with an outlet port for the waste gases and products of combustion, of a rotary combined admission and exhaust valve common to said inlet and outlet ports, and having a port adapted to register with said inlet and outlet ports at different times, and means for intermittently rotating said valve in such a manner that it stops twice during each cycle of operations of its cylinder, viz., during the period of admission and during the period of exhaust, for prolonging the normal periods that the inlet and outlet ports are open.

20. In an internal combustion engine, the combination with a set of inlet ports for delivering a charge and with a set of outlet ports for the waste gases and products of combustion, of a combined admission and exhaust valve common to said inlet and outlet ports and having a set of ports adapted to register with said inlet and outlet ports at different times, and means for operating said valve during the period of admission with a varying movement in such a manner as to prolong the normal period that the inlet ports are open.

21. In an internal combustion engine, the combination with a set of inlet ports for delivering a charge and with a set of outlet ports for the waste gases and products of combustion, of a combined admission and exhaust valve common to said inlet and outlet ports and having a set of ports adapted to register with said inlet and outlet ports at different times, and means for operating said valve during the period of exhaust with a varying movement in such a manner as to prolong the normal period that the outlet ports are open.

22. In an internal combustion engine, the combination with a set of inlet ports for delivering a charge and with a set of outlet ports for the waste gases and products of combustion, of a combined admission and exhaust valve common to said inlet and outlet ports and having a set of ports adapted to register with said inlet and outlet ports at different times, and means for operating said valve during the periods of admission and exhaust with varying movements in such a manner as to prolong both the normal period that the inlet ports are open and the normal period that the outlet ports are open.

23. In an internal combustion engine, the combination with a set of inlet ports for delivering a charge and with a set of outlet ports for the waste gases and products of combustion, of a combined admission and exhaust valve common to said inlet and outlet ports and having a set of ports adapted to register with said inlet and outlet ports at different times, and means for intermittently operating said valve while, and in such a manner as to prolong the normal period that, one set of engine ports is open.

24. In an internal combustion engine, the combination with a set of inlet ports for delivering a charge and with a set of outlet ports for the waste gases and products of combustion, of a combined admission and exhaust valve common to said inlet and outlet ports and having a set of ports adapted to register with said inlet and outlet ports at different times, and means for intermittently operating said valve while, and in such a manner as to prolong the normal periods that, the inlet and outlet ports are open.

25. In an internal combustion engine, the combination with a set of inlet ports for delivering a charge and with a set of outlet ports for the waste gases and products of combustion, of rotary-valve mechanism for opening and closing said ports, said mechanism embodying a rotary valve having a set of ports adapted to register at different times with one of said sets of engine ports and also embodying means for rotating said valve during the period of admission with a varying movement in such a manner as to prolong the normal period that said engine ports are open.

26. In an internal combustion engine, the combination with an inlet port for delivering a charge and with an outlet port for the waste gases and products of combustion, of a rotary combined admission and exhaust valve common to said inlet and outlet ports and having a set of ports adapted to register with said inlet and outlet ports at different times, and means for rotating said valve during the period of admission with a varying movement in such a manner as to prolong the normal period that the engine ports of one set are open.

27. In an internal combustion engine, the combination with an inlet port for delivering a charge and with an outlet port for the waste gases and products of combustion, of a rotary combined admission and exhaust valve common to said inlet and outlet ports and having a set of ports adapted to register with said inlet and outlet ports at different times, and means for rotating said valve during the periods of admission and exhaust with varying movements in such a manner as to prolong the normal periods that the inlet and outlet ports are open.

28. In an internal combustion engine, the combination with an inlet port for delivering a charge and with an outlet port for the waste gases and products of combustion, of rotary-valve mechanism for opening and closing said ports, said mechanism embodying a rotary valve having a port adapted to register at different times with one of said engine ports and also embodying means for intermittently rotating said valve during the period of admission in such a manner as to prolong the normal period that said engine port is open and for preventing rotation thereof during compression and explosion.

29. In an internal combustion engine, the combination with an inlet port for delivering a charge and with an outlet port for the waste gases and products of combustion, of a rotary combined admission and exhaust valve common to said inlet and outlet ports and having a port adapted to register at different times with said inlet and outlet ports, and means for intermittently rotating said valve during the period of admission and also during the period of exhaust in such a manner as to prolong the normal periods that said inlet and outlet ports are open and for preventing rotation of said valve during compression and explosion.

30. In an internal combustion engine, the combination with a plurality of cylinders each having an inlet port for delivering a charge and an outlet port for the waste gases and products of combustion, of a plurality of valves one for each cylinder each constituting a combined admission and exhaust valve having a port adapted to register with the inlet and outlet ports of its cylinder at different times, and means for actuating said valves in different timing and each with a varying movement during the period of admission in such a manner as to prolong the normal period that each of said valves is open to one of its cylinder ports.

31. In an internal combustion engine, the combination with a plurality of cylinders each having an inlet port for delivering a charge and an outlet port for the waste gases and products of combustion, of a plurality of valves one for each cylinder each constituting a combined admission and exhaust valve having a port adapted to register with the inlet and outlet ports of its cylinder at different times, and means for actuating said valves in different timing and each with a varying movement during the period of admission and also during the period of exhaust in such a manner as to prolong the normal periods that the inlet and outlet ports of each cylinder are open.

32. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for rotating said valves in different timing and each with a varying movement during the period of admission in such a manner as to prolong the normal period that each of said valves is open to one of its cylinders.

33. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for rotating said valves in different timing and each with a varying movement during the period of admission and also during the period of exhaust in such a manner as to prolong the normal periods that the inlet and outlet ports of each cylinder are open.

34. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for intermittently rotating said valves during their periods of admission in different timing in such a manner as to prolong the normal period that each of said valves is open to one of its cylinder ports.

35. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for intermittently rotating said valves in similar cycles differing in phase and intermittently during their periods of admission in such a manner as to prolong the normal period that each of said valves is open to one of its cylinder ports and for preventing rotation of said valves during compression and explosion.

36. In an internal combustion engine, the combination with a plurality of cylinders each having an inlet port for delivering a charge and an outlet port for the waste gases and products of combustion, of a plurality of rotary valves one for each cylinder each being a combined admission and exhaust valve having a port adapted to register with the inlet and outlet ports of its cylinder at different times, and means for intermittently rotating said valves in similar cycles differing in phase and intermittently during their periods of admission and exhaust in such a manner as to prolong the normal periods that the inlet and outlet ports of each cylinder are open and for preventing rotation of said valves during compression and explosion.

37. In an internal combustion engine, the combination with an inlet port for delivering a charge and with an outlet port for the waste gases and products of combustion, of rotary-valve mechanism for opening and closing said ports said mechanism embodying means for prolonging through an arc variable in extent the normal period that one of said ports is open.

38. In an internal combustion engine, the combination with an inlet port for delivering a charge and with an outlet port for the waste gases and products of combustion, of rotary-valve mechanism for opening and closing said ports said mechanism embodying means for prolonging through arcs variable in extent the normal periods that said inlet and outlet ports are open.

39. In an internal combustion engine, the combination with an inlet port for delivering a charge and with an outlet port for the waste gases and products of combustion, of a rotary combined admission and exhaust valve common to said inlet and outlet ports and having a port adapted to register with said inlet and outlet ports at different times, and means for rotating said valve in such a manner as to prolong through an arc variable in extent the normal period that one of said ports is open.

40. In an internal combustion engine, the combination with an inlet port for delivering a charge and with an outlet port for the waste gases and products of combustion, of a rotary combined admission and exhaust valve common to said inlet and outlet ports and having a port adapted to register with said inlet and outlet ports at different times, and means for rotating said valve in such a manner as to prolong through arcs variable in extent the normal periods that said inlet and outlet ports are open.

41. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for rotating said valves in such a manner as to prolong through an arc variable in extent the normal period that each of said valves is open to one of its cylinder ports.

42. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for rotating said valves in such a manner as to prolong through arcs variable in extent the normal periods that the inlet and outlet ports of each cylinder are open.

43. In an internal combustion engine, the combination with a plurality of cylinders each having an inlet port for delivering a charge and an outlet port for the waste gases and products of combustion, of a plurality of rotary valves one for each cylinder each being a combined admission and exhaust valve having a port adapted to register with the inlet and outlet ports of its cylinder at different times, and means for intermittently rotating said valves in similar cycles differing in phase and in such a manner as to prolong through arcs variable in extent the normal periods that the inlet and outlet ports of each cylinder are open.

44. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for rotating said valves in such a manner as to prolong the normal period that each of said valves is open to one of its cylinder ports, said means including a drive-shaft common to said valves.

45. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for rotating said valves in such a manner as to prolong the normal period that each of said valves is open to one of its cylinder ports, said means including a common drive-shaft geared directly to each of said valves.

46. In an internal combustion engine, the combination with a plurality of cylinders each having an inlet port for delivering a charge and an outlet port for the waste gases and products of combustion, of a plurality of rotary valves one for each cylinder and each controlling one of the engine ports of its cylinder, and means for rotating said valves in such a manner as to prolong the normal period that each of said valves is open to one of its cylinder ports, said means including a drive-shaft common to said valves and a Geneva movement between said drive-shaft and each of said valves.

47. In an internal combustion engine, the combination with an inlet port for delivering a charge and with an outlet port for the waste gases and products of combustion, of rotary-valve mechanism for opening and closing said ports, said mechanism embodying a rotary valve having a port adapted to register at different times with one of said engine ports and also embodying means for intermittently rotating said valve during the period of admission in such a manner as to prolong the normal period that said engine port is open, said means including a Geneva movement.

Signed at New York in the county of New York and State of New York this 5th day of July A. D. 1912.

PAUL H. MUELLER.
LUDWIG H. SCHULER.

Witnesses:
ANNE C. BARNES,
C. S. CHAMPION.

Copies of this patent may be obtained for five cents each, by addressing the "Commissioner of Patents, Washington, D. C."